United States Patent
Miyano et al.

[11] 3,922,519
[45] Nov. 25, 1975

[54] METHOD FOR A BUILD-UP WELDING OF DIFFERENT METALS

[75] Inventors: Katao Miyano; Shunichi Tomizuka; Takao Adachi, all of Muroran; Tomoo Takenouchi; Satoshi Kondo, both of Noboribetsu; Akira Hirama; Yasuo Endo, both of Muroran, all of Japan

[73] Assignee: Japan Steel Works Ltd., Tokyo, Japan

[22] Filed: Feb. 6, 1974

[21] Appl. No.: 439,863

[30] Foreign Application Priority Data
June 19, 1973 Japan .................. 48-68303

[52] U.S. Cl. .................. 219/76; 219/73
[51] Int. Cl.² .................. B23K 9/04
[58] Field of Search .................. 219/73, 76

[56] References Cited
UNITED STATES PATENTS

| | | | |
|---|---|---|---|
| 3,139,505 | 6/1964 | Kirschning | 219/76 X |
| 3,493,713 | 2/1970 | Johnson | 219/76 |
| 3,584,181 | 6/1971 | Nemoto et al. | 219/76 |
| 3,588,432 | 6/1971 | Arnoldy | 219/73 |
| 3,609,292 | 9/1971 | Arnoldy | 219/76 X |
| 3,659,075 | 4/1972 | Pellkofer | 219/73 X |

*Primary Examiner*—C. L. Albritton
*Assistant Examiner*—N. D. Herkamp
*Attorney, Agent, or Firm*—Wenderoth, Lind & Ponack

[57] ABSTRACT

A consumable electrode in the form of a wide band is fed into a flux powder uniformly distributed to an adequate thickness on a base metal disposed substantially horizontally, and, by virtue of an electric current flowing between the electrode and the base metal, the flux powder is melted, and, once the melted flux has been formed, the electrode is moved horizontally and in a direction perpendicular to its width to continuously melt the flux powder by the Joule heat due to the electric current flowing therethrough, and thus melting both the electrode and the base metal, whereby droplets of the electrode are dropped onto the melted base metal to form a bead on it.

1 Claim, 5 Drawing Figures

U.S. Patent  Nov. 25, 1975  3,922,519
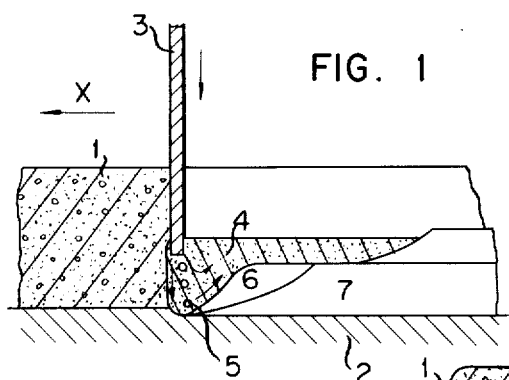
FIG. 1
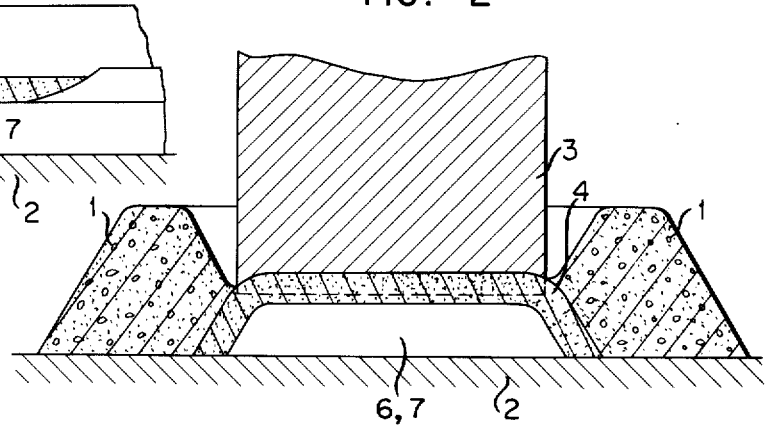
FIG. 2
FIG. 3
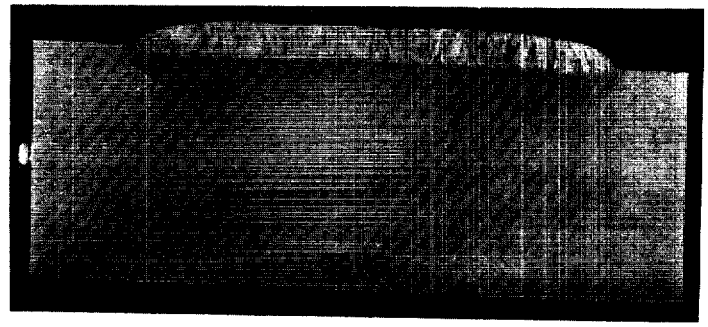
FIG. 4
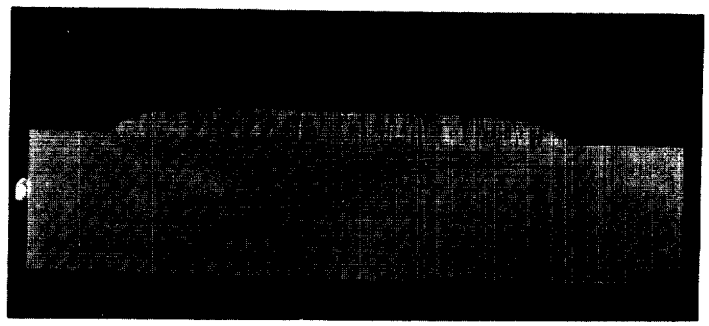
FIG. 5
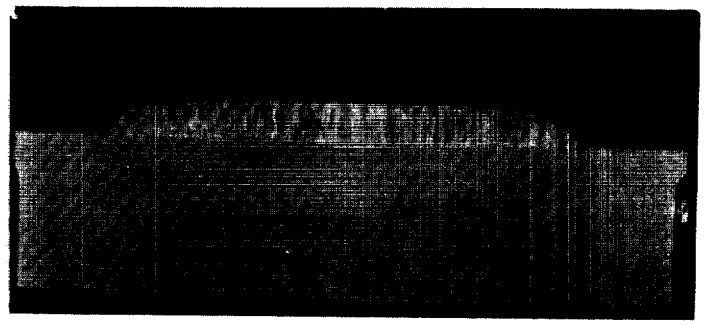

METHOD FOR A BUILD-UP WELDING OF DIFFERENT METALS

BACKGROUND OF THE INVENTION

The present invention relates to a method for the build-up welding of different metals, and more particularly to the horizontal electroslag welding method to obtain low penetrating, good quality build-up metals.

Generally, the requirements in the build-up welding of different metals are that;
1. The penetration ratio is small;
2. The bond line of the build-up metal is uniform and straight;
3. The surface of the build-up metal is smooth and fine;
4. Defects are not liable to occur in the lapped portions of subsequent beads;
5. The build-up metal has a pre-determined composition and thickness;
6. The quality of the build-up metal is good;
7. The melting rate of the electrode is high; and
8. The weldability is good.

Methods for the build-up welding of different metals, i.e. gas welding, inert-gas-shielded-arc welding, submerged arc welding (including a band-like electrode submerged arc welding), no-gas arc welding etc. have been hitherto well known, and further in the above methods it has been also known to oscillate the welding rod during the welding process or use combined core wires.

Of those methods, the submerged arc welding, in particular a submerged arc welding using band-like electrodes, is generally regarded to be the most preferable at present for the build-up welding of different metals, in that the melting rate of the electrode is high and the penetration is relatively low. However, in the actual operation, it is almost impossible to make the penetration ratio less than 10 percent. Further the thickness of the build-up-welded metal is 6 mm at the maximum in a single bead, and, if the thickness becomes larger than 6 mm, the contact angles at the toes of the bead become so large that, when another bead is overlapped thereon, it is easy for faults to occur in the overlapped portions. Since in the submerged arc welding using a band-like electrode it is necessary to increase the electric current as the thickness of the electrode becomes large, the penetration also becomes large; furthermore, the appearance of the bead becomes spoiled, and the contact angles at the toes of the bead also become large. Thus, when the penetration ratio and the welding workability etc. are taken into consideration, 100 mm and 0.5 mm are respectively considered to be the maxima for the width and thickness of the electrode.

SUMMARY OF THE INVENTION

An object of the present invention is to provide a method for a build-up welding of different metals which will eliminate all of the defects abovementioned as inherent to the conventional methods widely adopted in the field of the art.

In accordance with the present invention a method for the build-up welding of different metals is provided, which has far less penetration in comparison with the conventional welding methods, yielding a flawless, smooth refined bead surface as thick as desired in a range of 3 to 9 mm by virtue of the use of not only a thin band-like electrode but also a thick, broad electrode. Accordingly, all the requirements as above-listed demanded for the build-up welding of different metals can be fulfilled.

In practising the method of the present invention, the flux powder is uniformly distributed on the base metal for build-up welding to an adequate thickness of, for example, about 15 to 50 mm; and with the electrode being fed into the flux powder, if an electric current is continuously supplied by an ordinary welder provided with an electrode-feeding device, between the electrode moving horizontally and in the direction perpendicular to its width and the base metal, a build-up welding performance can be carried on. At the same time with the flow of an electric current arcs occur between the electrode and the base metal in the flux, which cease in a few seconds, and in their place there flows a stable current through the arc-melted slag of 5 to 15 mm depth; with the flow of the current through the melted slag without the generation of arcs, the electrode and the base metal are melted together by the Joule heat of the current flowing through the slag, thus forming beads on the base metal, which characterizes the present invention for the buildup welding of different metals through the horizontal electroslag welding.

The method for a build-up welding according to the present invention has the following advantages:
1. The penetration ratio is very small because welding is effected between the intimately slag-wetted base metal and welding metal and the melted slag temperature is about 2,000°C at the highest;
2. Flaws seldom occur in the overlapped portions of beads because the contact angles of the toes of each bead are small;
3. Flawless, smooth, thick build-up metals can be obtained;
4. With the use of a thick, broad electrode, build-up welding, with small penetration, can be obtained;
5. With a current constantly flowing through the melting slag, the welding operation can be made noiselessly; and with little fluctuation in the current and voltage, the welding operation can be performed under stable welding conditions with accuracy in thickness;
6. Since the build-up welded metal is perfectly shielded from the atmosphere by the melted flux, a clean metal containing little oxygen is obtainable; and
7. The consumption of the electrode composition is so small that a build-up-welded metal having compositions within a stable range can be obtained because of perfect shielding from the atmosphere by the melted flux, and, since the penetration of the melted electrode composition into the base metal is vary small, it is easy to obtain also a build-up-welded metal with an extremely low carbon content.

BRIEF DESCRIPTION OF THE DRAWINGS

The above and other objects, features and advantages of the invention will be more readily understandable from the following detailed description in conjunction with the accompanying drawings, in which:

FIG. 1 is a diagrammatical sectional view parallel to the welding direction, showing a system for carrying out the method according to the present invention;

FIG. 2 is a diagrammatical sectional view perpendicular to the welding direction, similar to FIG. 1; and FIGS. 3 to 5 are macroscopic photographs of the crosssections of the build-up-welded stainless steels obtained by a conventional submerged arc welding and the method according to the present invention.

DESCRIPTION OF THE PREFERRED EMBODIMENTS

Referring to FIGS. 1 and 2, there is shown diagrammatically one of the preferred systems for carrying out the method according to the present invention in the sectional views parallel and perpendicular to the welding direction, respectively.

In the method for build-up welding according to the present invention, unlike the conventional build-up welding methods in which an electrode is melted by an arc at elevated temperatures to penetrate into a base metal to be build-up-welded, as shown in FIGS. 1 and 2, a flux 1 is uniformly distributed on the base metal 2 to adequate thickness, for example, 15 to 50 mm, and an electrode 3 in the form of a thick, wide band is fed into the flux 1, so that when an electric current is passed between the electrode 3 and the base metal 2, an arc is generated between them to form a melted slag 4 therebetween, and at the same time the arc ceases. Then both the electrode 3 and the base metal 2 are melted by the slag 4 which is maintained at an elevated temperature by the Joule heat due to the electric current flowing through it so that the melted electrode 3 falls onto the surface of the base metal 2 in the form of droplets 5. On the other hand, the melted slag 4 so formed, by electrical and thermal convection, washes the surface of the base metal 2 to melt it, so that the droplets 5 falling on it form a molten pool 6 of metal which is intimately welded to the base metal 2, whereby, by continuously horizontally moving the electrode 3 in the direction perpendicular to its width as shown by the arrow X, a build-up-welded metal 7 is laid on the surface of the base metal 2 as a bead. Since the temperature of the melted slag 4 is about 2,000°C at the highest and the bead 7 is formed with the intimacy between the droplets 5 and the melted base metal 2 being washed by the convection of the slag 4, the penetration is made very small, the penetration ratio being possible to control to even as small a percentage as 1 to 2 percent.

In order to obtain a smooth, refined, flawless bead it is necessary to adequately select the composition, width and thickness of the electrode; the welding electric current, the voltage; the welding speed, the composition of the flux, the capacity of the welder, the length of the electrode extension, the shapes of the contact jaws, etc. It has been found that in the case of build-up welding of stainless steels on a mild steel or low-alloyed steel as the base metal using the method according to the present invention the required electric current density of the electrode is 7-60 A/mm$^2$ and the required electric current density in the direction of the electrode width is 10-23 A/mm. If the electric current densities are below the lower limits shown, the bead is apt to become discontinuous and the electrode may be easily short-circuited so that a stable welding operation becomes impossible. Contrarily, if the current densities are above the upper limits shown, the penetration is made so large that the advantageous features of the present invention disappear. If the shape of the electrode and electric current are suitably selected so that the current densities are regulated to fall within those ranges shown, a smooth fine bead having little penetration can be obtained actually without subjecting to any limitation the width and thickness of the electrode. However, when the capacity of the welding machine and the welding workability are taken into consideration, the suitable ranges of thickness and width of the electrode fall within 0.4 to 3 mm and 25 to 300 mm, respectively.

Now the preferred methods according to the present invention will be explained more precisely as follows:

It is one of the features of the build-up welding method according to the present invention, as already explained above, that, even though an electric current is supplied through a consumable electrode, no arc is generated between the electrode and the base metal, but, in order to achieve such a feature, it is, in particular, essential to suitably select the composition of the flux, so, in the following explanation, an example of the flux composition will be also briefly described in conjunction with the build-up welding of a stainless steel on a mild steel as a base metal. FIG. 3 shows a macroscopic photograph of the crosssection of a build-up-welded portion in the case where a 18 Cr - 8 Ni stainless electrode having a width of 75 mm and a thickness of 1 mm is arc-welded using a conventional flux for a build-like electrode submerged arc build-up welding with a welding current of 1,300 A, voltage of 28 V and welding speed of 150 mm/min. FIG. 4 shows a macroscopic photograph of the crosssection of a build-up-welded portion in the case where the same electrode as used for FIG. 3 is build-up-welded by the method according to the present invention using a flux to be described later with a welding current of 1,500 A, voltage of 24 V and welding speed of 150 mm/min, the flux being so prepared that a mixture comprising, by weight, 64 percent of calcium fluoride, 17 percent of alumina, 5 percent of iron oxide, 4 percent of silica, 3 percent of manganese oxide, 5 percent of chrome oxide and 2 percent of zirconium oxide is melted to be ground after it has solidified.

Comparing FIG. 3 and FIG. 4, it will be appreciated that, though the thickness of the build-up-welded metal in both cases is about 5 mm, the penetration ratio is about 25 percent in the case of the conventional arc welding, whereas, in the case of the build-up welding according to the present invention, the penetration ratio is only about 6 percent.

FIG. 5 shows a macroscopic photograph of the crosssection of a welded portion in the case where the same electrode as in the former cases is build-up-welded by the method according to the present invention with an electric current of 1,400 A, voltage of 24 V and welding speed of 90 mm/min. Viewing FIG. 5, it will be seen that a build-up-welded metal of about 8 mm thickness with good contact angles at the toes of the bead is obtained while the penetration ratio is only about 3 percent.

While preferred embodiments of the present invention have been described above, it will be understood that modifications may be made without departing from the spirit of the present invention.

What is claimed is:

1. A method for build-up welding of different metals comprising the steps of uniformly distributing a flux powder on a base metal to be build-up welded disposed substantially horizontally, leading into said flux a consumable electrode in the form of a wide band, passing an electric current between said electrode being continuously fed towards the base metal to be build-up welded and said base metal, controlling the current density of said electrode such that it is between 7 and 60 A/mm$^2$, and controlling the current density of the electrode in the direction of its width such that it is between 10 and 23 A/mm as in the case of the build-up welding of a stainless steel on a mild or low-alloyed steel as the base metal; moving said electrode substantially horizontally in the direction perpendicular to the width of said electrode after said flux has been melted so that said flux, said electrode and said base metal are substantially continuously melted by the molten flux being heated by the Joule heat due to the electric current flowing therethrough, and thus melting said flux, said electrode and said base metal in such a manner that both said electrode and said base metal form a bead on the surface of the base metal.

* * * * *